2,532,368

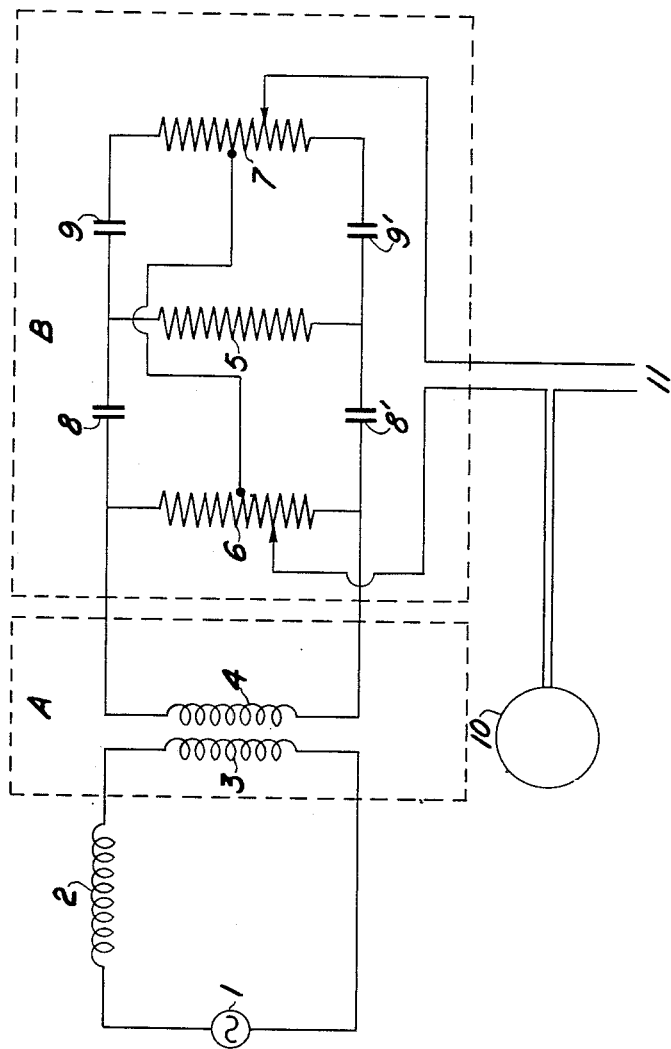
INVENTORS
JOHAN DAVID MALMQVIST
GOTTHARD VICTOR ARNOLD GUSTAFSSON
STEN STURE TOBIAS WERNER
BY Stevens, Davis & Miller
their ATTORNEYS Patented Dec. 5, 1950

UNITED STATES PATENT OFFICE 2,532,368

VOLTAGE PHASE CONTROL CIRCUIT

Johan David Malmqvist, Boliden, Gotthard Viktor Arnold Gustafsson, Hoglandstorget, and Sten Sture Tobias Werner, Akeslund, Sweden, assignors to Bolidens Gruvaktiebolag, Skelleftehamn, Sweden, a joint-stock company limited of Sweden Application February 9, 1948, Serial No. 7,218
In Sweden November 11, 1944

Section 1, Public Law 690, August 8, 1946
Patent expires November 11, 1964

1 Claim. (Cl. 323—111)

This invention relates to apparatus for detecting and determining the configuration and extensiveness of subterranean deposits of materials such as ores, oil, slates and the like. More particularly, it relates to the detection and determination of these subterranean deposits by the detection of variations in electromagnetic fields extending into the surface of the earth. Even more particularly, it relates to an electrical compensating network particularly adapted for use in such determinations.

Prior to this invention, alternating electromagnetic fields were established in the earth and variations in these fields detected as indications of subterranean deposits. The detection was normally accomplished by moving a coil of wire, or a similar magnetic pick-up, through the magnetic field above the earth. The current generated in this coil of wire or magnetic pick-up was then compared, as to phase and intensity, with the electrical current used to establish the field under observation.

Prior to this invention it was common to pass a portion of the current used to establish the magnetic field under observation, through a phase shifting network, and adjust this phase shifting network until its output was in-phase with the current from the exploring coil or pick-up. The phase shift necessary to bring these two currents into phase was then determined and the relative intensities of the two currents were also determined and from this information a determination of the location and extent of subterranean deposits was made.

The present invention has for its object the provision of a simpler, more expedient phase and intensity matching circuit to be connected between the main current circuit, which activates the electromagnetic field, and the circuit of the exploring device or field coil.

This improved compensating circuit consists entirely of potentiometers and capacitors and is so arranged that a setting of one of the two potentiometers determines the amount of inphase current supplied from the main circuit while the setting of another potentiometer determines the amount of current 90° out of phase, supplied from the main power circuit. Furthermore, by moving the sliders of the potentiometers past their mid-points, the phase of the current taken from each of the potentiometers may be reversed so that the output of the circuit can be made to correspond to any desired intensity of any of the desired phase angle of current.

This invention can best be described by reference to the appended drawing which is a schematic illustration of its preferred embodiment. In the drawing, driving current is supplied by a source of alternating current 1 to a pair of transformer primaries 2 and 3 connected in series therewith. Current is taken from a secondary (not shown) coupled to the transformer primary 2 in the usual way, for the establishment of an alternating electromagnetic field.

Current is taken from the secondary 4 coupled to the transformer primary 3, for the operation of a compensator of this invention. The transformer 3, 4 is shown in the dotted line box A and the compensator is shown in the dotted line box B.

The compensator of this invention is comprised of two center-tapped potentiometers 7, the center taps being connected together. The secondary 4 of the transformer 3, 4 is connected across the outer terminals of the first potentiometer 6. The outer terminals of the potentiometer 6 are then connected through condensers 8 and 8' to the ends of a fixed resistor 5 and the ends of the fixed resistor 5 are connected in turn through condensers 9 and 8' respectively to the outer terminals of the second potentiometer 7. The sliders of the potentiometers 6 and 7 are connected to the output terminals of the compensator and from there to an exploring instrument 10 and a zero indicating instrument 11 (not shown) which are connected in series.

Preferably the condensers 8, 8', 9 and 9' are of the same capacity and the potentiometers 6 and 7 and the resistor 5, are of the same resistance. Various combinations that will give the desired phase shift can easily be calculated.

When the device is in operation, power from the alternating current generator 1 supplies power to the transformer that energizes the field and power to the transformer 3, 4 that operates the compensator. In-phase or 180° out of phase current, in any desired amplitude is taken from the potentiometer 6 by a proper adjustment of the slider, and 90° out of phase current or 270° out of phase current is taken from the potetiometer 7 by proper adjustment of the slider thereon. These two currents are combined to give a current of any desired phase relation and any desired intensity relation.

When this combined current is properly adjusted in phase and intensity so that it exactly balances the current generated in the exploring device 10, the zero indicating instrument 11 will indicate zero. The settings of the sliders on the potentiometers 6 and 7 then indicate the amount of in-phase and the amount of out of phase current necessary to cause the desired compensation.

Having now particularly described and ascertained the nature of our said invention, and in what manner the same is to be performed we declare that what we claim is:

An alternating current compensator for use in inductively detecting subterranean deposits, that comprises two center-tapped potentiometers with their center taps connected together, connections for supplying alternating current to the opposite ends of one of said potentiometers, a condenser connected to each of the ends of said potentiometer, a resistor connected between the opposite sides of said condensers, a second pair of condensers connected to the opposite ends of said resistor and having their opposite sides connected to the opposite ends of the second potentiometer, and connections between the sliders of said potentiometers and the circuit to be compensated.

JOHAN DAVID MALMQVIST.
GOTTHARD VIKTOR ARNOLD GUSTAFSSON.
STEN STURE TOBIAS WERNER.

REFERENCES CITED

The following references are of record in the file of this patent:

UNITED STATES PATENTS

| Number | Name | Date |
|---|---|---|
| 1,717,400 | Nyquist | June 18, 1929 |
| 2,062,630 | Zuschlag | Dec. 1, 1936 |
| 2,220,070 | Aiken | Nov. 5, 1940 |
| 2,230,803 | Klipsch et al. | Feb. 4, 1941 |

OTHER REFERENCES

"Geophysical Exploration," Heiland, pages 780–785, pub. 1940 by Prentice-Hall, Inc., N. Y.